Figure 1:
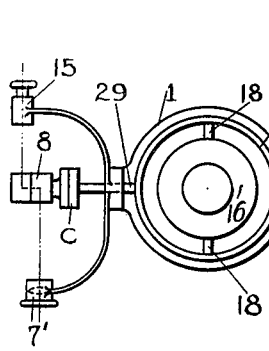

Oct. 30, 1928.

G. B. CROUSE 1,689,327

FIRE CONTROL INSTRUMENT

Filed Feb. 7, 1925

7 Sheets-Sheet 1

INVENTOR.
George B. Crouse
BY
ATTORNEYS.

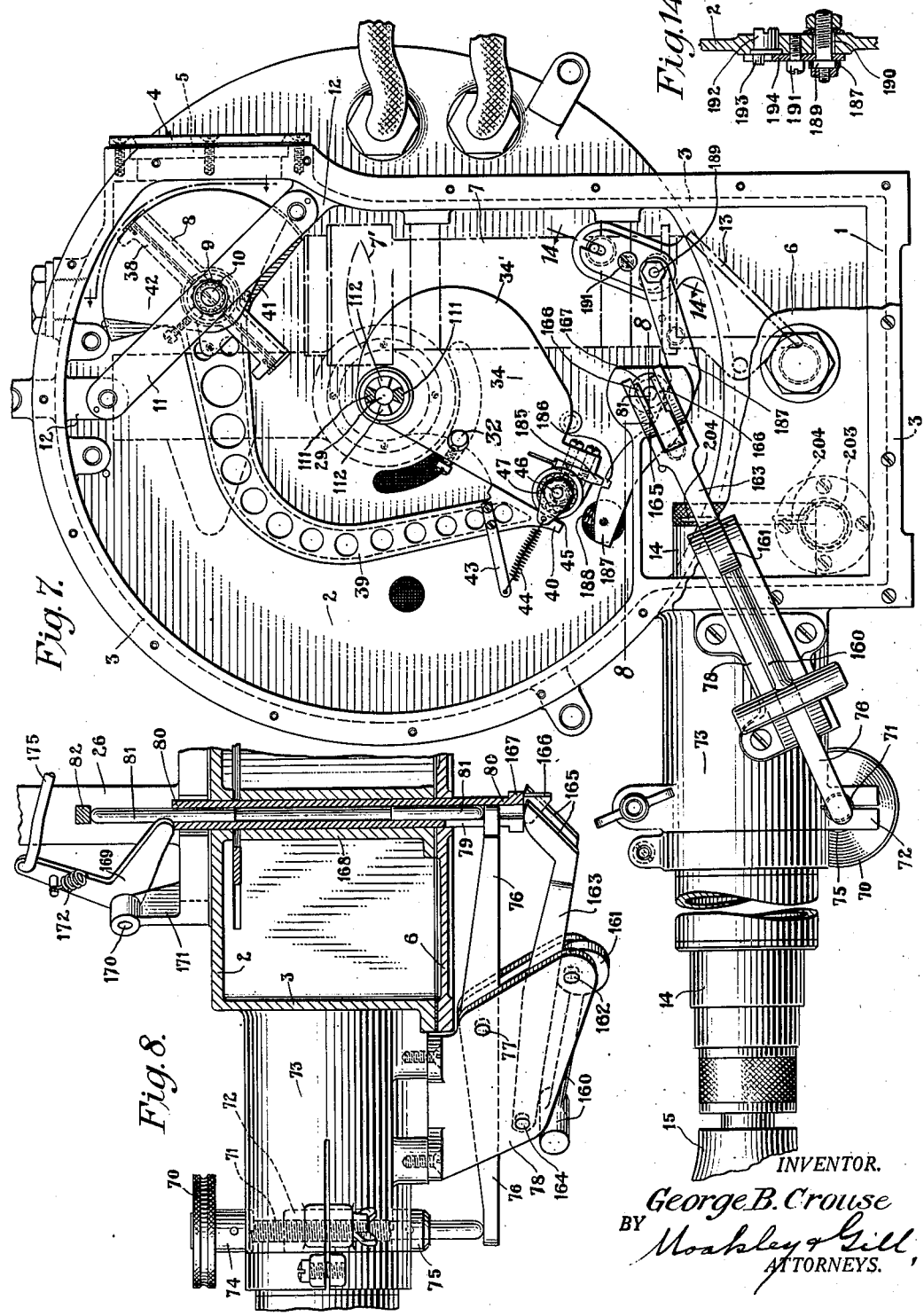

Oct. 30, 1928.

G. B. CROUSE

FIRE CONTROL INSTRUMENT

Filed Feb. 7, 1925

1,689,327

7 Sheets-Sheet 3

INVENTOR.
George B. Crouse
BY
ATTORNEYS.

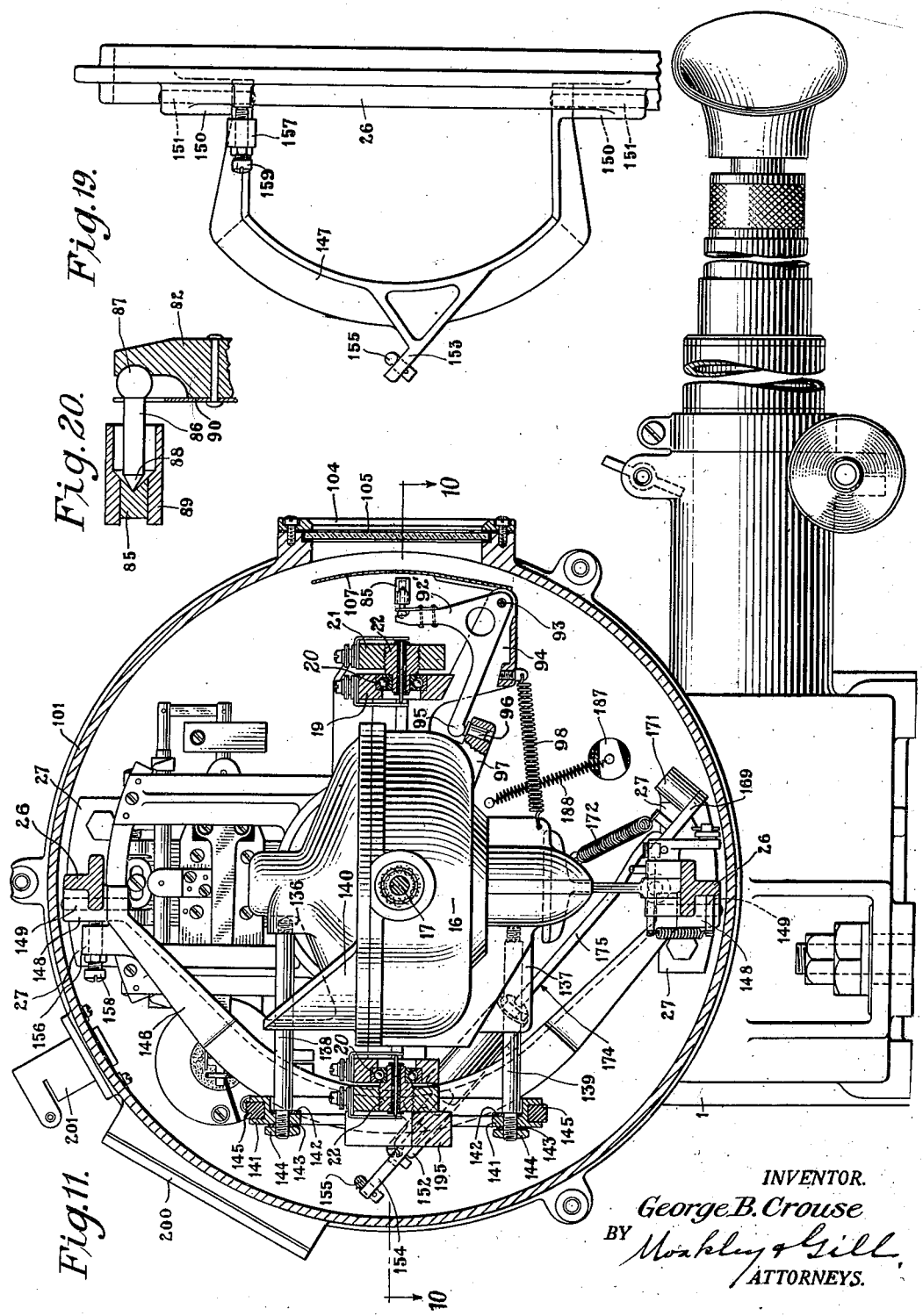

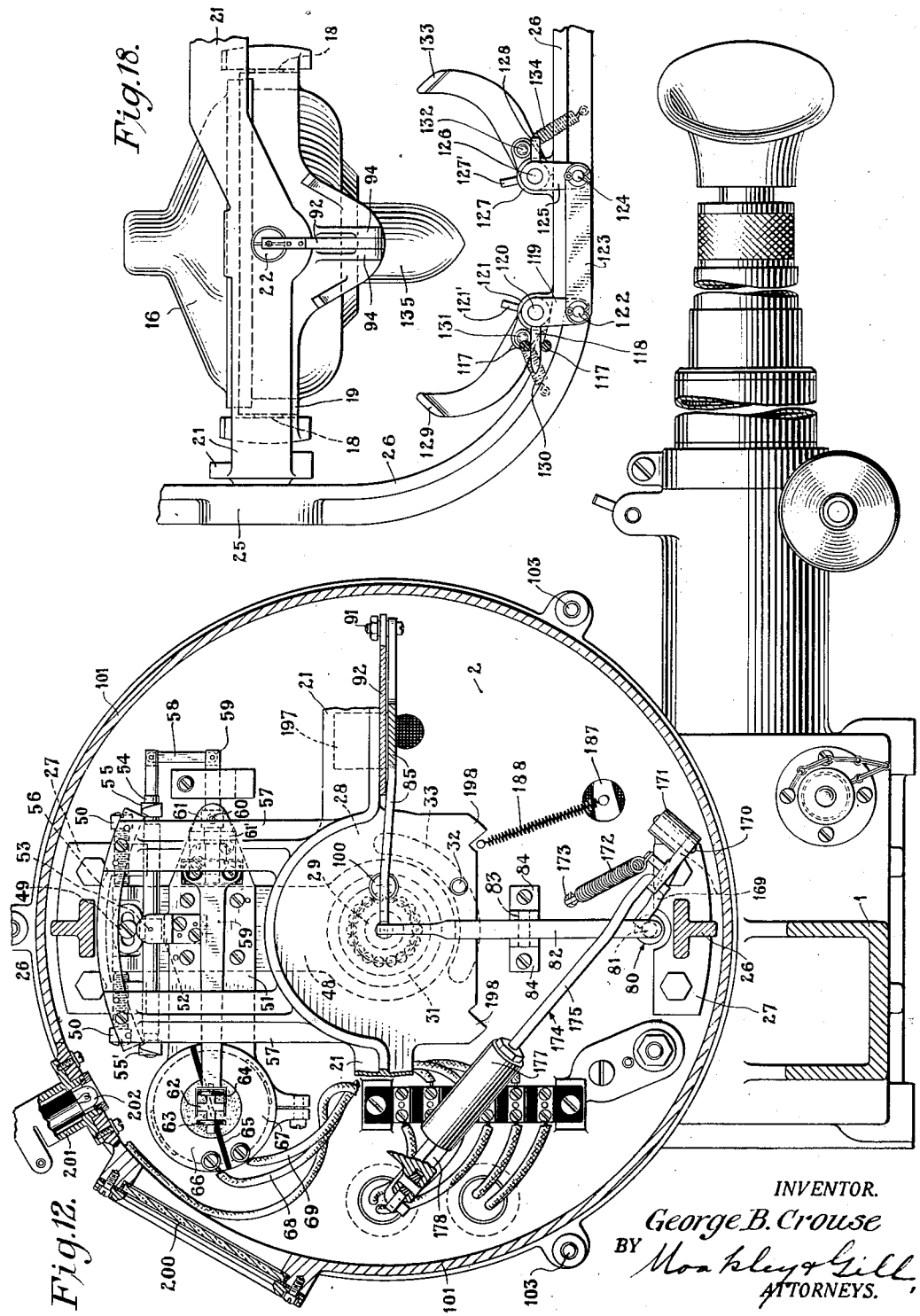

Oct. 30, 1928.
G. B. CROUSE
1,689,327
FIRE CONTROL INSTRUMENT
Filed Feb. 7, 1925
7 Sheets-Sheet 7
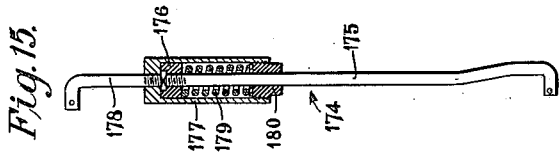
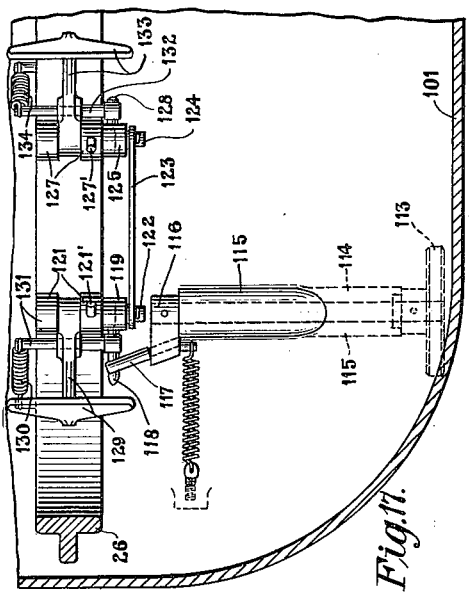
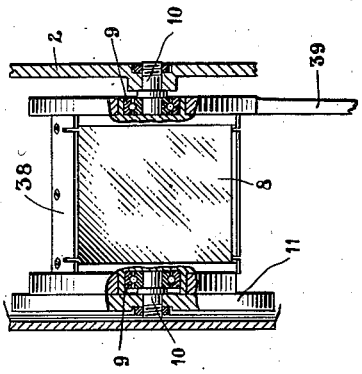
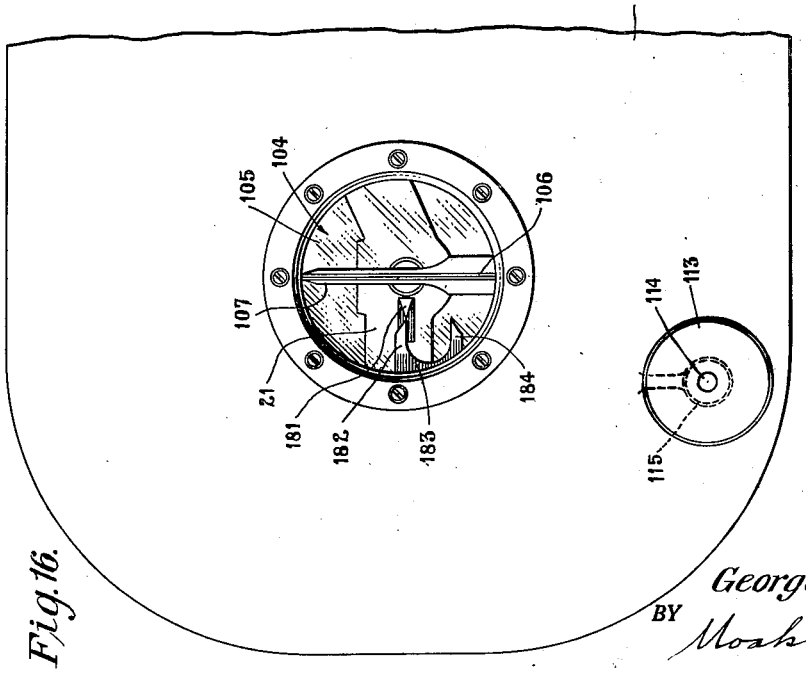
INVENTOR.
George B. Crouse
BY
Moshley + Gill
ATTORNEYS.

Patented Oct. 30, 1928.

1,689,327

UNITED STATES PATENT OFFICE.

GEORGE B. CROUSE, OF WOODCLIFF, NEW JERSEY, ASSIGNOR TO FORD INSTRUMENT COMPANY, INC., OF LONG ISLAND CITY, NEW YORK, A CORPORATION OF NEW YORK.

FIRE-CONTROL INSTRUMENT.

Application filed February 7, 1925. Serial No. 7,665.

This invention relates to fire-control instruments in which a gyroscopic pendulum is employed to control the actuation of the elements of a firing mechanism and to stabilize a coacting optical system.

The gyroscopic pendulum as usually constructed consists of a gyroscope mounted for oscillation about two axes at right angles to its spinning axis, which is ordinarily vertically disposed. The center of gravity of the gyroscope is usually below its center of support. A gyroscopic pendulum possesses much greater stability than a simple pendulum, and has been used for stabilizing elements of marine instruments to compensate for the effects of oscillatory motions of craft on which they are mounted. The spinning axis of a gyroscopic pendulum is however, subject to small slow wanderings from its normal vertical position due to the application of external forces, such as friction at the supporting bearings, the effect of accelerations on the pendulous mass and other causes. When such a device is used for stabilizing an instrument, adjustments must be made from time to time to compensate for the effect of straying of the gyroscope on the stabilized elements.

This adjustment may be accomplished either by applying a force to the gyroscope to cause it to precess back to its normal position when it wanders therefrom, or the stabilized elements may be so arranged that their relation to the gyroscope may be altered to bring them to the desired position while the gyroscope is allowed to wander as it may. It is to instruments having the second of the above-named modes of adjustment that this invention relates. An instrument of this character is shown in British patent to James Blacklock Henderson, No. 16,669 of 1915.

In instruments of this type the gyroscope consisting of an electrically driven rotor and a supporting case is mounted within a ring upon an axis parallel to the axis of the optical elements of the instrument. The ring is mounted in the frame of the instrument upon an axis perpendicular to the first named axis and by means of suitable connections controls the stabilized elements to compensate for the effect of oscillatory movements of the craft on which the instrument is mounted. The connections include means whereby the relation of the stabilized elements to the ring from which they are controlled, and therefore to the gyroscope, may be altered to compensate for the effect of straying of the gyroscope about the axis about which stabilization takes place, that is about the supporting axis of the ring.

Under usual conditions the oscillatory movement of the craft will be due to both rolling and pitching, so that in addition to the oscillatory movement about an axis perpendicular to the line of sight, which it is the purpose of the instrument to compensate for, there will be an oscillatory movement about an axis at right angles to the other axis. If the sighting device be directed at an object so distant that the line of sight is horizontal, it will be moved parallel to itself as a result of the second oscillatory movement and no error will be introduced under these conditions.

If, on the other hand, the sighting device be directed at a nearby object from a considerable elevation, such as an observing station on a mast, the line of sight will be depressed below the horizontal. Oscillatory movement of the craft about an axis at right angles to the axis about which stabilization takes place will cause the sighting device to be shifted about both the vertical and horizontal axes with consequent changes of the position of the object in the field of view, and corresponding errors in the controlled apparatus, as the operator attempts to overcome these changes by keeping the image of the object in a fixed position in the field of view.

Viewed in another way the errors described above are analogous to those which occur in the position of a gun due to rolling of the craft about the line of sight, when the gun is elevated, and which it is the object of cross levelling, as it is usually called, to correct.

A similar error is introduced when the gyroscope wanders about the axis about which stabilization takes place, in which case the sighting device must be adjusted by hand to bring it back to the horizontal position, assuming the object to which it is directed to be a distant one. As the gyroscope wanders about the stabilization axis, the axis at right angles thereto, that is, the one between the gyroscope and its supporting ring becomes inclined to its normal horizontal position and the sighting device is forced to swing about this inclined axis, due to oscillatory movement of the craft about an axis at right angles to the stabilization axis. Variations of the position of the image of the distant object in the field of view will thus be produced with consequent errors in the use of the apparatus.

It is an object of this invention to provide a fire control instrument having a gyroscopically controlled optical system and firing mechanism, in which the errors described above are eliminated by the structure of the apparatus. This is accomplished by the provision of a second or outer ring to which the stabilized elements of the sighting device are non-adjustably attached and which serves as a support for an inner ring within which the gyroscope is mounted. As distinguished from the prior instrument described above the mechanism by which the relation between the gyroscope and the stabilized elements may be changed is placed between the gyroscope and the inner ring, so that the axis by which the inner ring is supported within the outer ring may be adjusted in relation to the gyroscope, but the stabilized elements bear a fixed relation to this axis which is perpendicular to the axis about which stabilization takes place. By virtue of this arrangement the axis about which the sighting device moves due to oscillations of the craft about an axis parallel to the line of sight may be kept parallel to the line of sight under all conditions, thereby avoiding the errors resulting from the lack of parallelism of these axes, which are present in prior instruments of this character.

In instruments such as the one shown in the above mentioned British patent and the one to which the present invention relates, the oscillatory movement of the ship causes more or less swaying of the gyroscope and the elements connected to it when the gyroscope is not running. It is therefore desirable to provide mechanism for clamping or locking the gyroscope and its associated parts when they are not in operation. In the copending application filed by Hannibal C. Ford, on October 27, 1923, Serial No. 671,125, for fire control instrument, there is shown a locking arrangement applied to a form of instrument in general like that shown in the Henderson British patent referred to above. This mechanism consists of a latch adapted to engage a projection on the gyroscope to prevent movement about one of the supporting axes and another latch adapted to engage a notch in a plate forming part of the connections between the gyroscope and the stabilized optical elements for preventing movement of the gyroscope about the other axis.

It is a further object of the present invention to provide an improved mechanism for locking or clamping the gyroscope when it is not running or for use under certain special emergency conditions for rendering the gyroscope ineffective as far as its stabilizing function is concerned even when it is running. In accordance with the invention this mechanism consists of a member, preferably of circular shape, attached to the casing of the gyroscope and adapted to be engaged by two brake members which may be simultaneously drawn against it to prevent turning of the gyroscope about an axis perpendicular to the plane of the circular member as well as about an axis parallel to it. Relative movement between the gyroscope and its supporting elements is thus prevented when the ship is rolling and pitching and the gyroscope is not in operation, or even when it is in operation under certain special conditions. There is also provided a latching device for locking the optical elements and the parts of the firing mechanism which are controlled by the gyroscope, so as to prevent any tendency for these parts to swing independently of the gyroscope when the latter is locked or clamped.

Figure 4:
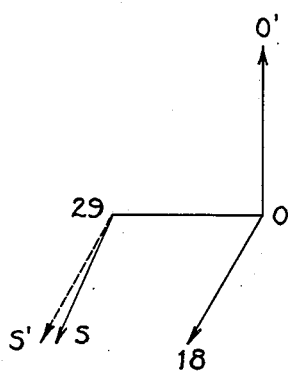
Figure 5:
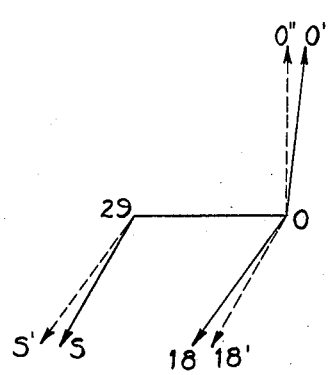
Figure 9:
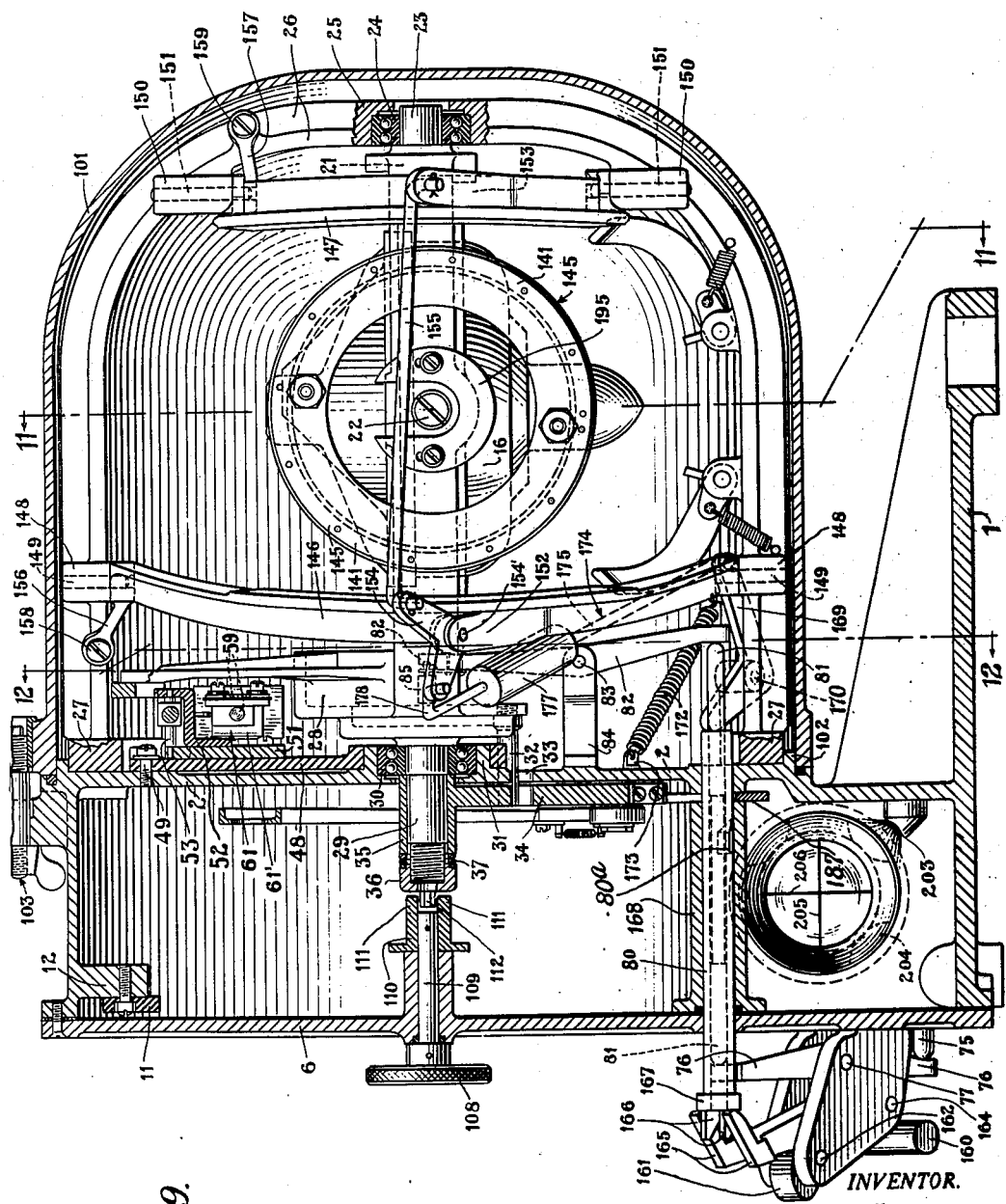
Figure 10:
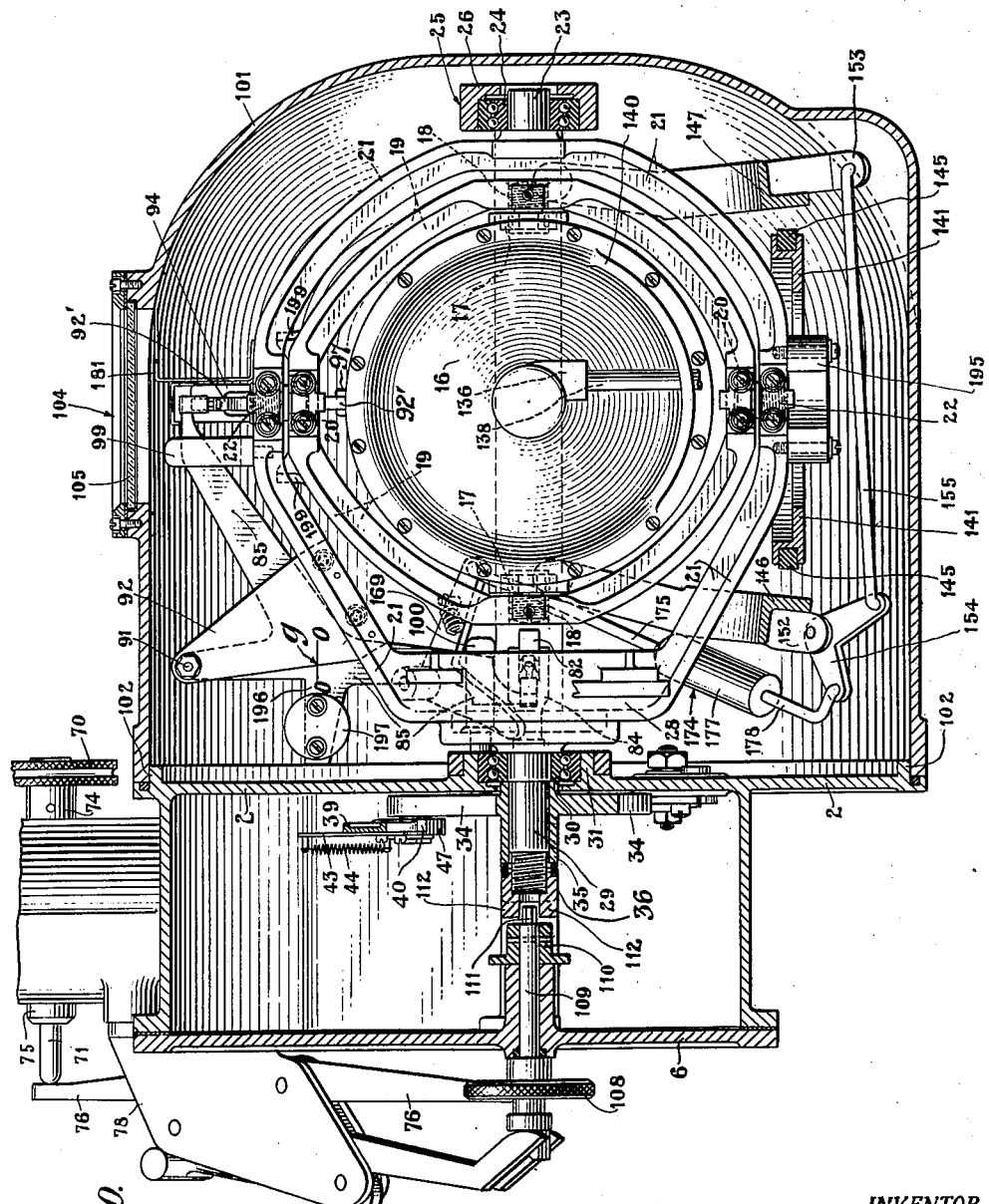

The particular nature of the invention, as well as other objects and advantages thereof, will appear most clearly from a description of a preferred embodiment which will be prefaced by an explanation supplemented by simplified diagrams of the difference between the prior form of instrument and the present one, especially with reference to the errors in the earlier instrument which are overcome in the present one. In the drawings Fig. 1 is a plan view of the principal elements of the instrument shown in the above mentioned British patent, Fig. 2 is an an elevation of the same instrument, Figs. 3, 4 and 5 are perspective axial diagrams for use in connection with an explanation of the sources of error in the instrument of Figs. 1 and 2, Fig. 6 is a similar diagram of the instrument improved in accordance with the present invention, Fig. 6ª is a diagram similar to Fig. 3, but is applicable to the instrument of Fig. 6, Fig. 7 is an elevational view of the instrument, the interior of the optical chamber thereof being rendered visible by the breaking away of its cover, Fig. 8 is a detail view in plan of part of the structure and mechanism illustrated in Fig. 7, the sectioned portion being taken substantially on the line 8—8 of the latter figure, Fig. 9 is a vertical section through the optical and gyroscope chambers of the instrument, the brake mechanism being clearly shown in elevation, Fig. 10 is a horizontal section taken approximately on the line 10—10 of Fig. 11, some parts being arbitrarily shown in elevation for improved illustration, Fig. 11 is a vertical section through the gyroscope chamber, being taken principally on the line 11—11 of Fig. 9, Fig. 12 is a similar view, but is taken substantially on the line 12—12 of Fig. 9, and shows the firing gear unobstructed by the other elements illustrated in Fig. 11, Fig. 13 is a detail view of the stabilized mirror, Fig. 14 is another detail sectional view taken on the line 14—14 of Fig. 7, and shows adjusting means for setting the stabilized mirror with respect to the telescope, Fig. 15 is a sectional view of the spring link of the braking mechanism.

Fig. 16 is an elevational view of a portion of the gyroscope chamber housing, showing, through a window, the gyroscope precession indicators, Fig. 17 is a fragmentary horizontal section illustrating gyroscope precessing mechanism, Fig. 18 is another fragmentary elevation of the same mechanism, Fig. 19 is an elevation of one of the brake shoes mounted on the U-shaped bracket of the frame of the instrument, and Fig. 20 is a sectional detail view of one of the automatically adjustable thrust connections.

Figures 2, 6:
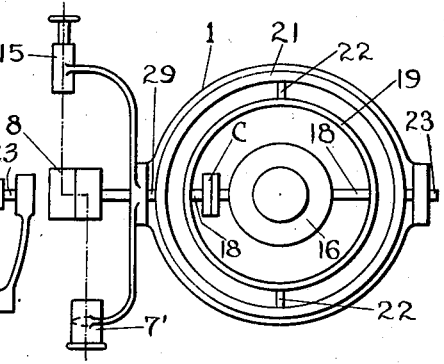

Referring particularly to Figs. 1 and 2 in which, for convenience, corresponding elements are designated by the same reference numerals as will be hereinafter employed in connection with the description of the complete instrument, 1 indicates a supporting frame adapted to be fixed to the craft on which the instrument is mounted. 16 indicates a gyroscope consisting of the usual rotor and surrounding case, which is mounted by means of trunnions 18, 18 in a ring 19 which is mounted by trunnions 23 and 29, at right angles to trunnions 18, 18, in the frame 1. The optical system consists of an objective 7' and an eye-piece 15 which are attached to the frame 1 in any suitable manner and therefore partake of the angular movement of the ship as does the frame 1. 8 indicates an optical element, such as a combination of reflecting prisms, which is stabilized by the gyroscope through a connection to trunnion 29, this connection including an adjusting device C (which, for the purpose of the diagram, is shown as a light friction clutch), whereby the relation of the element 8 to the gyroscope may be adjusted about the trunnion axis 23—29.

Figure 3:
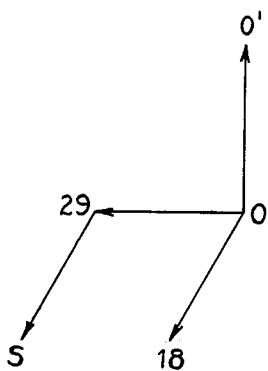

In Fig. 3 a spinning axis of the gyroscope, which, since it does not appear in the complete instrument, is designated O—O' and occupies a true vertical position on the assumption that the gyroscope is rotating in a true horizontal plane. The line O—18 represents the axis through the trunnions 18, 18 starting from the spinning axis of the gyroscope and the line O—29 represents the similar axis at right angles to the first named axis, or in other words the axis about which stabilization takes place. The line 29—S represents the line of sight to a distant object through the optical axis of the sighting device composed of elements 7', 8 and 15. In Fig. 3 it is assumed that the distant object is so far away that the line of sight is truly horizontal and therefore parallel to O—18, since the trunnions 18, 18 are truly horizontal with the assumed position of the gyroscope.

The arrangement described above is intended to compensate for oscillatory movement of the ship about a horizontal axis perpendicular to the line of sight, which it does because the plane of the gyroscope remains fixed in space thus holding the element 8, while the frame 1 and the other optical elements 7' and 15 move with the ship. In addition to the oscillatory movement of the ship about a horizontal axis perpendicular to the line of sight, there will ordinarily be similar movement about an axis parallel to the line of sight, since the ship will be both rolling and pitching. This will be manifest in the instrument by relative movement between the gyroscope and the surrounding elements about the axis 18—18. This will be equivalent to rotating the line O—29 in Fig. 3 about the line O—18 as an axis. Since the optical axis of the sighting device lies along the line 29—S which lies in the plane defined by the lines O—18 and O—29, it will be moved parallel to itself as the line O—29 moves. Under these conditions the optical axis of the sighting device and the line of sight will always coincide and there will be no shifting of the image of the distant object in the field of view due to oscillatory movement of the craft about an axis parallel to the line of sight.

Fig. 4 represents the conditions when the sighting device is directed to a nearby target and perhaps from a considerable elevation so that the line of sight makes a substantial angle with its former horizontal position. As before, the spinning axis of the gyroscope is assumed to be truly vertical as indicated by the line O—O' of this figure and the trunnions 18, 18 are horizontal as is the corresponding line O—18 of the diagram. In this case however, the new line of sight represented by the line 29—S makes an angle with its former horizontal position which is indicated by the broken line 29—S'. As the line O—29 rotates about the line O—18 due to oscillatory movement of the craft about an axis in the general direction of the line of sight, the line 29—S will swing to move with respect to the line 29—S' which will be manifest by a shifting of the image of a distant object in the field of view of the sighting device in both vertical and horizontal directions. It will be understood that in the operation of the instrument it is the duty of the operator to keep the image in fixed relation to cross wires or the like and as he does this under the conditions now being considered corresponding errors will be introduced into the apparatus, such as a gun, which is being controlled from the instrument.

A similar error is introduced when the line of sight is truly horizontal but the gyroscope wanders off about the axis 23—29. In such a case the sighting device is adjusted relatively to the gyroscope by means of the device C to keep it in horizontal position with its optical axis coinciding with the line of sight. This condition is represented by Fig. 5 in which the broken line O—O'' represents the true vertical and the line O—O' the spinning axis which has been displaced from its former to vertical position. Since the trunnions 18, 18 lie at right angles to the spinning axis they will be correspondingly displaced as represented by the line O—18 with respect to their true horizontal position as represented by the broken line O—18'. In its original condition the axis of the sighting device was parallel to the axis 18—18 as is represented by the broken line 29—S' which is the position the axis would occupy had it not been shifted to coincide with the line of sight as represented by the line 29—S in this figure. The oscillatory movement of the ship about an axis at right angles to the stabilization axis causes the elements of the instrument to swing about the trunnions 18, 18, now corresponding to the line O—18, since the position of these trunnions is determined by the new position of the gyroscope. Therefore, as before, the line 29—S oscillates so as to move with respect to the line 29—S' with consequent changes of the position of the image of the distant object in the field of view and the introduction of errors in the controlled apparatus as the operator overcomes these displacements by manipulating the instrument.

The manner in which the errors explained above are overcome by the present invention is shown in a simple way in Fig. 6 in which the gyroscope 16 is mounted by trunnions 18, 18 within the ring 19 but the adjusting device C is placed between the gyroscope and the ring. The ring 19 is in this case mounted by trunnions 22, 22 in an outer ring 21 which in turn is mounted by trunnions 23 and 29 on the frame 1 and has non-adjustably attached to it the stabilized optical element 8 which, as before, coacts with an objective 7' and eye-piece 15 carried on the frame 1, all of these elements constituting the sighting device. In this arrangement the device C forms a connection between the gyroscope and ring 19 whereby the latter together with ring 21 and connecting trunnions 22, 22 are stabilized about the coinciding axes 18—18 and 23—29, thereby stabilizing the optical system about a horizontal axis perpendicular to the line of sight. The stabilized optical element 8 is however fixed in relation to trunnions 22, 22, so that even when the line of sight is depressed the sighting device moves about this trunnion as an axis when the ship oscillates about an axis substantially parallel to the line of sight.

This is represented in Fig. 6ª which is a diagram similar to Fig. 3, but applicable to Fig. 6. In this case the line O—22 represents the stabilized trunnions 22, 22 which are always parallel to the optical axis of the sighting device, but the relation of this line may be changed with respect to the line O—O' which represents the spinning axis of the gyroscope, by means of the adjusting device C. This is indicated by the line O—O''' which represents the position assumed by the axis after the gyroscope has wandered about the coinciding axes O—18 and O—29. The lines O—22 and 29—S are always parallel, which means that the optical axis of the sighting device moves about an axis which is parallel to the line of sight under all conditions. The relative angular displacements of these axes under the conditions of Figs. 4 and 5 do not occur and the errors resulting therefrom are therefore eliminated.

The invention as embodied in a complete instrument will now be described in connection with Figs. 7 to 20 inclusive in which some of the elements will at once be recognized from the reference to them in connection with the diagrams. 1 represents the base of a frame, extending upwardly from which is a wall 2, that, except for a small rectangular lower portion, is circular. Projecting perpendicularly from one side of the wall 2 is another wall 3, these walls forming an optical chamber, containing a window 4 that is closed by a piece of glass 5. The optical chamber is closed by a cover 6, and is sealed by gaskets against the admission of moisture.

Positioned with respect to the window 4, so as to reflect light rays entering through it into an optical tube 7, containing the objective 7' is a mirror 8. This mirror is provided with ball bearings 9 which are rotatively supported on trunnions 10, as shown in Figs. 7 and 13. One of the trunnions 10 is mounted on the wall 2, while the other trunnion 10 is carried by a bar 11, which is secured at opposite ends to bosses 12 that project inwardly from the wall 3. The optical tube 7 is part of a bent telescope and at its lower end is provided with a prism 13 that again reflects the light rays into another tube 14 of the telescope, so that they are presented to the eye of an observer at the eye-piece 15. In Fig. 7, the optical tube 7 is shown in dot and dash lines, since it is of well-known construction, and a phantom effect is thereby obtained which effects a clearer illustration of some of the parts of the instrument.

The gun firing mechanism of the device is mounted on the opposite side of the wall 2, as clearly pictured in Fig. 12, and the stabilization of certain of its parts, as well as that of the field of view of the telescope, is accomplished by the use of a gyroscope 16, which is shown in Figs. 9, 10, 11 and 18. The gyroscope is preferably of the induction motor type, having a rotor adapted to revolve at high speed when the stator circuit is closed. There has been no attempt to show the electrical connections in detail, since this type of gyroscope is well known in the art, and its particular internal and electrical arrangements per se form no part of the present invention.

At diametrically opposite places, the gyroscope 16 is provided with recessed bosses on its casing, in which ball bearings 17 are inserted, as shown in Figs. 10 and 11. Trunnions 18 are screw threaded into an inner gimbal ring 19, and have unthreaded portions of reduced diameter that extend into the inner raceways of the ball bearings 17 which are tightly fitted thereon. On an axis normal to the trunnion axis 18—18, the inner gimbal ring 19 is provided with recessed bosses in which are ball bearings 20 similar to the ball bearings 17. Screw threaded into an outer gimbal ring 21 are trunnions 22, like the trunnions 18, the trunnions 22 entering with retentive fit the inner raceways of the ball bearings 20.

At the right in Fig. 10, the gimbal ring 21 is approximately semi-circular, and from the flattened central portion thereof extends a trunnion 23. The inner raceway of a ball bearing 24 is rigidly fitted on the trunnion 23, the outer raceway of the bearing 24 being retained in a recessed boss 25 of a U-shaped bracket 26, which is part of the frame of the instrument. The legs of the bracket 26 extend toward the wall 2, as shown in Fig. 9, and are provided with feet 27 that are bolted or otherwise secured to that wall.

In extending to the left of the trunnions 22, as viewed in Fig. 10, the sides of the outer gimbal ring 21 are principally straight and approach each other until they merge with an end plate 28, shown clearly in Fig. 12 as being semi-circular in its upper portion, and from which projects a trunnion 29, carrying the inner raceway of a ball bearing 30 that is set into an annular boss 31, which projects from one side of the wall 2.

The outer gimbal ring 21 is therefore supported in the frame of the instrument by the wall 2 and U-shaped bracket 26, so as to be capable of turning about the trunnion axis 23—29. The inner gimbal ring 19 is connected to and supported by the outer gimbal ring 21 through the trunnions 22 in such manner as to allow the outer gimbal ring to turn about the trunnion axis 22—22, when the craft rolls in a direction to turn the instrument frame about that axis. The gyroscope 16 is hung from the inner gimbal 19 on the trunnion axis 18—18.

When the gyroscope 16 is in operation its plane of rotation remains fixed in space, and the inner gimbal ring 19 is stabilized by the gyroscope about the axis 22—22. As hereinafter explained, the inner gimbal ring 19, although adjustable at will about the axis 18—18 is normally stabilized also about this axis, by means to be later described. Hence, the outer gimbal ring 21 is also normally stabilized about the axis 23—29, which is coincident with the axis 18—18, but is adjustable about that axis simultaneously with the inner gimbal ring 19.

A pin 32 is screwed into the lower part of the end plate 28 of the outer gimbal ring 21, the threaded end of which is shown in Fig. 12. The pin 32 extends through a curved slot 33 in the wall 2, and enters a trigger plate 34 on the opposite side of that wall, as is clear from Fig. 9. This view also shows the trigger plate 34 to be provided with a hub 35 that is slipped over the trunnion 29 of the outer gimbal ring. At its inner end, the hub 35 bears against the inner raceway of the ball bearing 30, being forced thereagainst by a nut 36 threaded onto the trunnion 29 and by an intervening spring 37. The nut may be pinned to the trunnion after a proper adjustment has been made. It thus becomes obvious that the outer gimbal ring 21, on one side of the wall 2, and the trigger plate 34, on the other side thereof, are interconnected for fixed mutual relationship, whereby, when the outer gimbal 21 is stabilized, the trigger plate 34 will likewise be stabilized. The trigger plate 34 has a protruding rounded portion 34' which causes its mass to be balanced about the axis 23—29 to prevent it from applying a torque to the gyroscope about this axis, which would cause precession about the axis 22—22 at right angles thereto.

Due to the rolling of the ship about a horizontal axis perpendicular to the line of sight to the distant object being viewed by the instrument, the parts that respond to such movements and are free from gyroscopic stabilization, will turn about the axis 23—29 of the outer gimbal ring. First considering those of these free parts that are in the optical chamber, it is clear that the wall 2 and the bar 11 of the instrument frame will turn about the axis 23—29, as, consequently, must the mirror trunnions 10. Accompanying these trunnions in their movement will be a frame 38 for the mirror 8 and a bent lever 39 combined therewith, which at its free end terminates in a foot 40. On the opposite side of the center of one of the mirror trunnions 10, the bent lever 39 is provided with a counterweight 41, another and adjustable counterweight 42 for the lever being mounted on the opposite side of the mirror frame 38, where it is retained in adjusted position by a set screw.

Near its foot 40, the lever 39 has an arm 43 secured to it. One end of a spring 44 is attached to the free end of the arm and the opposite end of the spring is connected to a link 45, which is mounted on a stud 46 that is carried by the trigger plate 34. An anti-friction roller 47 is mounted on the stud 46, the foot 40 of the bent lever 39 being maintained in automatically adjustable contact therewith by the spring 44, of the yielding connection just described. The distance from the axis of the mirror trunnions 10 to the axis of the roller stud 46 is twice that from the axis 23—29 of the trunnions of the outer gimbal ring to the axis of the roller stud 46, so that the mirror 8 will be turned, by the adjustment of the lever 39 to the roller 47, through an angle equal to one-half that through which the ship rolls. The mirror 8 will, therefore, remain on the object upon which it has been brought to bear, since the plate 34 to which the end of arm 39 is connected is stabilized by the gyroscope.

On the opposite side of the wall 2, parts of the firing mechanism are also caused to turn with the wall 2 about the axis 23—29 of the trunnions of the outer gimbal ring 21, in response to the rolling of the ship. One of these parts is an angularly adjustable base plate 48, shown in Fig. 9 to encircle the annular boss 31 that projects from one side of the wall 2. A screw 49 holds the base plate 48 in fixed adjusted position, other screws 50 shown in Fig. 12 to be on opposite sides of the base plate being employed to effect the adjustment.

Secured to the base plate 48 is a lateral supporting arm or plate 51 mounted on which is a fulcrum bracket 52, a fulcrum pin 53 having bearings in said bracket 52 and in the supporting plate 51, as shown in Figs. 9 and 12. Pivoted by the pin 53 is a double arm lever 54 secured to which equidistantly each side of the fulcrum pin 53 are escapement lugs 55 and 55'. Adapted to co-act with the lugs 55 and 55' is a trigger 56 that is mounted on the upper ends of a pair of arms 57, which are formed integrally with and project upwardly from the end plate 28 of the outer gimbal ring 21.

Inasmuch as the outer gimbal ring 21 is normally stabilized about its trunnion axis 23—29, through the influence of the gyroscope 16, the trigger 56 is also stabilized, and is engaged by one or the other of the escapement lugs 55 and 55', as the unstabilized parts of the firing mechanism turn about the axis 23—29 of the outer gimbal ring, when the ship rolls. A link 58 transfers the consequent oscillation of the lever 54 to another lever 59 that is fulcrumed on a pin 60 that is journalled at its opposite ends in the lateral plate 51 and in a Z-shaped bracket 61. A wall 61' of this bracket is apertured for the passage and movement of the lever 59. The latter is a built-up lever, the portion to which the link 58 is connected being cylindrical, the lever 59 also having a mounting for a flat portion which is forked at its free end.

Within its fork, the lever 59 carries a cruciform support 62 for a pair of contact wheels 63 and 64, which at the gun-firing moment span, in conjunction with their support 62, an insulating strip 65, so that the contact wheels bear on carbon inserts in two semi-circular contacts 66 and 67. In this position, the conductors 68 and 69 of a firing circuit are thus placed into mutual electrical communication, whereby the circuit is closed through the firing mechanism.

At times it may become desirable to adjust the mirror 8, which may be done by operating the knob 70, shown in Figs. 7 and 8. Turned by a knob 70 is a screw shaft 71, which is threaded through a split lug 72 that depends from a split tubular part 73 of the instrument frame, which with its wing nut serves as a clmap for the tube 14 of the telescope. A hub 74 of the knob 70 and a collar 75 fixed on the shaft 71 coact with the lug 72 on the tubular part 73 of the instrument frame to limit the longitudinal movement of the shaft 71.

A reduced portion of this shaft has a rounded end with which to control the adjacent end of a double arm lever 76 which has a fulcrum pin 77 mounted in a bracket 78. This bracket is screwed to the tubular part 73 of the instrument frame. The other end of the lever 76 is of reduced width and passes through a slot 79 in a tubular plunger 80 hereinafter more fully referred to, and bears against an inner plunger 81. The latter plunger is telescoped with the tubular plunger 80 and has enlarged end portions that find their bearings in the latter plunger.

Projecting beyond the inner end of the tubular plunger 80, the inner plunger 81 engages the lower end of a double arm lever 82. The pivot pin 83 for the lever 82 is mounted in a bifurcated bracket 84 that is fastened to the wall 2. The upper end of the lever 82 has an automatically adjustable connection with a bell crank lever 85, which has its contour shown in Fig. 10. In the drawings, the bell crank lever 85 is shown as being horizontally disposed. The referred to connection is clearly illustrated on an enlarged scale in Fig. 20, wherein the upper end of the lever 82 is seen to be inset and provided with a spheric indenture. A thrust pin 86 is provided with a spherical head 87 that has a portion seated in the spheric indenture, the opposite end of the pin being tapered at 88 to a sharp point. The adjacent end of the bell crank lever 85 has a conical indenture of greater angularity than that of the taper of the sharp end of the thrust pin 86. Fastened to the adjoining end of the bell crank lever 85 is a cup 89 into which the thrust pin 86 extends to enable its tapered end to find a point bearing in the bottom of the conical recess in the end portion of the bell crank lever 85.

The clearance about the portion of the thrust pin 86 that is in the cup is sufficiently great to allow the pin to have any angular displacement that relative movement of the ends of the lever 82 and the bell crank lever 85 may require of it, without developing any binding engagement. Thus, the pin 86 delivers only a simple unaffected thrust despite the fact that the bell crank lever 85 is carried by a normally stabilized outer gimbal ring 21 and the lever 82 is adapted to be swung with the wall 2 about the trunnion axis 23—29 of that gimbal ring. A thin sheet metal guard 90 is attached to the upper end of the lever 82, and is slotted to form a fork that extends on opposite sides of the pin 86, and prevents its possible loss.

In Fig. 10, the bell crank lever 85 is seen to be pivoted at 91 to a bracket 92 fastened to the outer gimbal ring 21. The opposite end of the bell crank lever 85 is spaced from the first considered end by exactly 90° of circular measure. Here it is provided with another automatically adjustable connection, like that shown in Fig. 20 between itself and another bell crank lever 92′, which is shown in Fig. 11 to be vertically disposed. The vertical bell crank lever 92′ is pivoted on a pin 93 between the parallel sides of a stirrup-like bracket 94, which is integrally formed with and depends from the inner gimbal ring 19, as shown in Fig. 11.

An upwardly and inwardly extending arm of the bell crank lever 92′ has a rounded terminal 95 which bears on a wear plug 96 inserted in a hole in a lug 97 that projects from the casing of the gyroscope 16. Connecting the stirrup-like bracket 94 to the gyroscope casing is a spring 98, the pull of which tends, to some extent, to turn the vertical bell crank lever 92′, shown in Fig. 11, about the rounded terminal 95 of its inwardly extending arm.

With the rounded terminal 95 thus functioning as a fulcrum, the upper end of the other arm of the bell crank lever 92′ forces the thrust pin of its connection to the horizontal bell crank lever 85 against the adjacent end of the latter. The other end of the bell crank lever 85, therefore, forces its associated thrust pin 86 against the upper end of the double arm lever 82, the lower end of which pushes against the inner plunger 81. This plunger then seeks to turn the double arm lever 76 about its fulcrum 77 as much as the rounded end of the partly threaded shaft will allow the opposite end of this lever to move. It is accordingly clear that one of the functions of the spring 98 is to remove back lash or lost motion from the just traced linkage.

In this linkage, the horizontal bell crank lever 85 has one of its arms supportedly guided in a slitted post 99 mounted on the outer gimbal ring 21 near the vertical bell crank lever 92′, as shown in Fig. 10. The other end of the horizontal bell crank lever 85 is similarly supportedly guided in another slitted post 100 affixed to the end plate 28 of the outer gimbal ring 21, as also shown in Fig. 10. The bell crank lever 85 is consequently firmly supported by the outer gimbal ring 21 in such manner that the end of its arm that is associated with the upper end of the double arm lever 82 is always intersected by the axis of the trunnions 23 and 29 of the outer gimbal ring 21. When, therefore, the wall 2, the lever 82 and the other unstabilized parts of the instrument turn about the axis 23—29 in response to the rolling movement of the ship, they do not influence the horizontal bell crank lever 85 to turn, the point connection shown in Fig. 20 developing no appreciable turning movement.

Fitted over the U-shaped bracket 26 is a housing 101 that is drawn over an annular flange 102 on one side of the wall 2, and toward that wall by studs 103 and wing nuts threaded thereon, the joint being gasket sealed. The housing 101 forms a gyroscope chamber on the side of the wall 2 opposite to that on which the optical chamber is present. The housing 101 is provided with a window 104 closed by a piece of glass 105 and sealed with a gasket. On the glass is a diametrically extending engraved line 106 behind which is seen a pointer 107, on and extending longitudinally of which is a line broader than the line 106 on the window glass.

In Fig. 11, the pointer 107 is clearly shown to be attached to the stirrup-like bracket 94 formed on the inner gimbal ring 19. Should the gyroscope 16 wander about the trunnion axis 22—22 the angular disposition of the pointer 107 to the line 106 engraved on the window glass 105 will acquaint an observer of the fact.

To correct for such wandering gyroscope-precessing mechanisms are provided. One of these is operated by a knob 108 that is mounted on a short shaft 109, which passes through the cover 6 of the optical chamber, as shown in Figs. 9 and 10. On its inner end the shaft 109 has a coupling member 110 pinned to it, this member having a pair of diametrically opposed prongs 111 projecting from it. Other similar prongs 112 on the trigger plate retaining nut 36 project between the prongs 111 on the coupling member 110, (see Figs. 7, 9 and 10), effecting a drive by which the trigger plate 34 and the end plate 28 of the outer gimbal ring 21 and this ring itself, may be urged in unison in either direction. This will exert a torque about the trunnion axis 23—29, to thereby cause the gyroscope 16 to precess about the trunnion axis 22—22.

If the required precession be about the axis 18—18 that is coincident with the axis 23—29, a knob 113, shown in Figs. 16 and 17, is operated. A shaft 114 is operable to turn with the knob, this shaft being retained in a tubular bearing 115, which is cast with the housing 101 to project both outwardly of and inwardly into the same. At the inner end of the tubular bearing, the shaft 114 has an eccentric collar 116, shown in Fig. 17. Inclined pins 117 eccentric to the shaft 114 project from the collar 116, whereby a crank is formed.

The pins 117 extend to receive between them, as shown in Figs. 17 and 18 another pin 118 driven into the hub of an arm 119 mounted on a short shaft 120 journalled in a pair of spaced bearings 121. These bearings are integrally formed with the lower leg of the U-shaped bracket 26, and extend upwardly therefrom.

At its lower end the arm 119 has a pin 122 projecting from it, and a link 123 is pivotally mounted on it and on another like pin 124, which projects from another arm 125. The latter is mounted on another short shaft 126, which is journalled in spaced bearings 127 like the bearings 121. The arm 125 is also provided with a pin 128 corresponding to pin 118, except that it is not formed to be received by actuating pins like the pins 117.

Between the bearings 121, a T-shaped arm 129 is mounted on the short shaft 120, and is normally drawn toward the frame 26 by a spring 130. One end of the spring is attached to a pin projecting from the frame 26, while its opposite end is connected to a pin 131 that is fastened in and extends transversely of and through the leg of the T-shaped arm 129 that is pivoted about the shaft 120. The pin 131 has an enlarged head that bears against the pin 118 which projects from the hub of the arm 119.

A pin 132 extends through another T-shaped arm 133 and has a head that bears against the pin 128, the opposite end of the pin 132 being connected by a spring 134 to a pin that projects from the frame 26.

Operating the knob 113 turns the collar 116 and its pair of pins 117 in one direction or the other, thus moving the pin 118 to swing the interconnected arms 119 and 125 either clockwise or counter-clockwise. When they are moved clockwise, the pin 118 pushes against the pin 131, swinging the T-shaped arm 129 about the axis of the short shaft 120 until the head or cross bar of the T bears against a weight 135 depending from and formed with the casing of the gyroscope 16. The result is the application of a torque about the axis 22—22, which causes a precession about the axis 18—18.

When the arms 119 and 125 are moved counter-clockwise, the pin 118 moves away from the pin 131 and the T-shaped arm 129 is not actuated. At such times, the arm 125 causes its pin 128 to move the pin 132 on the other T-shaped arm 133, so that it encounters the weight 135 of the gyroscope. Torque is again applied about the axis 22—22, the precession of the gyroscope being about the axis 18—18, but in a reversed direction. Pins 121' and 127', projecting from the bearings 121 and 127, prevent an overthrow of either of the T-shaped arms 129 and 133, as the pin 131 will engage the pin 121' and the pin 132 will be stopped by the pin 127'.

During periods when the instrument is not in use and the gyroscope is de-energized, the pivoted parts of the instrument are passive. There will be a continual pivotal motion at the bearings, unless guarded against, due to the substantially ever-present surface agitation of the water on which the vessel floats. As this produces needless wear on the bearings of the instrument and is undesirable, means are provided to effect a rigid unification of the instrument parts when the instrument is out of use.

To this end, braking and latching means are incorporated in the stabilized sight herein disclosed. Inherent in the arrangement is the further advantage of maintaining the gyroscope 16 in its normal operative position while it is inactive, whereby when it is energized it is not necessary to excessively precess it into its proper axial position while its rotor is attaining its stabilizing speed.

In Fig. 11, the gyroscope 16 is shown to have an upper boss 136 and a lower boss 137 into which cylindrical upper and lower studs 138 and 139, respectively, are screwed. A curved standard 140 extends upward from the cover of the gyroscope casing and assists in properly supporting the stud 138, reducing the extent of its unsupported length. The reduced outer ends of the studs 138 and 139 are screw threaded and pass through an inner circumferential flange of a brake ring 141. A washer or reinforcing plate 142 abuts the shoulder on each of the studs 138 and 139, and lies against the inner face of the inner circumferential flange of the brake ring 141. Against the outer face of this flange a lock washer 143, on the reduced threaded free end of each stud, is forced by a nut 144. A comparatively deep groove extends around the periphery of the brake ring 141, and inset therein is a cylindrically disposed brake lining 145, which may be made of leather and is shown as having a square cross section.

On opposite sides of the brake ring 141 are brake shoes 146 and 147, as shown in Fig. 9, the former being larger than the latter. Lugs 148 are cast on the upper and the lower horizontal legs of the U-shaped bracket 26, and the larger brake shoe 146 extends therebetween and is pivoted thereto by pins 149, as shown in Figs. 9 and 11. Between its places of pivotal connection with the lugs 148 near the central vertical plane of the instrument, the brake shoe 146 bows out until its middle portion is positioned so that it can upon movement tangentially engage the brake lining 145 of the brake ring 141. Similarly, the brake shoe 147 fits between upper and lower lugs 150, which are also cast on the U-shaped bracket 26, pivot pins 151 hinging the brake shoe 147 to this bracket so that it may be swung into tangential contact with the brake lining 145 of the brake ring 141.

That the brake shoes 146 and 147 may act in unison, they are coupled together. The brake shoe 146 has an upwardly inclined projecting ear 152, and the smaller brake shoe 147 has a similar ear 153. (See Figs. 9, 11 and 19.) Joining one of these projecting ears 153 and a bell crank lever 154 that is pivoted to the ear 152 is a link 155, its opposite ends being pivotally connected to these parts. Near their upper ends, the brake shoes 146 and 147 have laterally offset arms 156 and 157, respectively, threaded through which are adjusting screws 158 and 159. Lock nuts on these screws maintain them in selected adjusted position in the arms 156 and 157, the screws being adapted to engage lugs or bosses on the U-shaped frame 26. Thus, the brake shoes 146 and 147 are adjustable as to the distance they may be retracted from the brake ring 141.

To actuate the brake shoes 146 and 147, means are provided which includes a pivoted T-shaped operating handle 160 shown in Figs. 7 and 8. The pivoted end of this handle is in the form of an eccentric 161 having a fulcrum pin 162 that has its opposite ends seated in the upper and lower separated walls of the bracket 78. Lying between these walls is a lever 163 pivoted thereto by a pin 164 and having a bifurcated free end 165. Between the bifurcations of this free end extend a pair of prongs 166, which project from a head 167 on the outer end of the tubular plunger 80. The prongs 166 and the bifurcations of the end 165 of the lever 163 are thus interleaved for intimate mutual guidance. The lever bifurcations are curved for a changing contact with the head 167 of the tubular plunger 80.

Movement of the operating handle 160 slides the tubular plunger 80 in a tubular bearing 168 that is cast with and projects from the wall 2 into proximity to the optical chamber cover 6, as clearly shown in Fig. 8. Extending inwardly beyond the wall 2, the tubular plunger 80 is adapted to actuate another bell crank lever 169, which is pivoted at 170 to an arm 171 that extends from the lower foot 27 of the U-shaped bracket 26. A spring 172 has one of its ends attached to a pin on one of the arms of the bell crank lever 169, the other end of the spring being attached to an eye 173 affixed to the wall 2 of the instrument, as shown in Fig. 9. Therefore, when the parts are in the positions shown in the drawing, the spring 172 acts on the bell crank lever 169 to force the tubular plunger 80 outward, this requiring the operating handle 160 to be in the off position.

When, however, the operating handle 160 is swung from the position shown in Figs. 7, 8 and 9 in a counter-clockwise direction, the eccentric 161 swings the lever 163 toward the optical chamber 6, driving the plunger 80 inward, which turns the bell crank lever 169 on its pivot 170. This bell crank lever thereupon exerts a pull on a spring link 174, which, as shown in Fig. 15, comprises a piston stem 175, a piston 176, a cylinder 177, a cylinder stem 178, a coil spring 179 within the cylinder and an apertured plug 180 threaded into the open end of the cylinder, closing the same.

As the cylinder stem 178 of the spring link 174 is pivotally connected to the end of one of the arms of the bell crank lever 154, as shown in Fig. 9, this lever is turned about its pivotal connection 154' to the ear 152 on the brake shoe 146. The link 155 is accordingly moved, whereby its pivotal connection to the ear 153 of the brake shoe 147 causes the latter to be swung about the axis of its pivot pins 151, in a direction toward the brake ring 141.

Since to apply the brake shoe 147 to the brake ring 141 the bell crank lever 154 is turned counter-clockwise, as viewed in Fig. 9, the pivotal connection between the stem 178 of the spring link and the adjoining arm of the bell crank lever 154 is moved toward the right. At the same time, the pivotal connection between the end of the other arm of the bell crank lever 154 and the link 155 is moved toward the left as viewed in Fig. 9, and the fulcrum pin 154' of the lever 154 moves toward the right under the stress developed in the linkage now under consideration. The force applied in this direction to the fulcrum pin 154' drives the ear 152 and the brake shoe 146 to the right, causing this brake shoe 146 to also impinge against the brake ring 141. The arrangement permits a simultaneous gripping of the brake ring 141 by the brake shoes 146 and 147, and an increasing braking force is applied to the brake ring, due to a continued movement of the operating handle 160 after the brake shoes 146 and 147 have engaged the brake ring 141. Such continued movement stretches the spring link 174, compressing its spring 179, thereby increasing the stress in the linkage and the binding of the brake shoes against the brake ring 141. The operating handle 160 is swung quickly and without hesitation to effect a positive braking action best suited to the desired locking or clamping of the gyroscope.

The gyroscope 16, through its rigid connection to the brake ring 141, is thus immovably held against rotary movement about the trunnion axis 22—22. It is also held against turning about the trunnion axis 18—18 (coincident with the trunnion axis 23—29), the brake shoes 146 and 147 having, for a considerable distance, a curvature parallel with the path of possible position of the diametrically opposite engagement places on the brake lining 145 of the brake ring 141 for the brake shoes 146 and 147.

In addition to throwing the operating handle 160 quickly, it is desirable to swing it at or near a time when the ship is at its mid-roll, so that the gyroscope 16 shall be in approximately its normal position with relation to the other elements of the instrument. That this may occur, the outer gimbal ring 21 has a pointer 181 mounted on it, which extends into proximity to the window 104 in the housing 101 of the gyroscope chamber. When the ship is upright, as when it is at its position of mid-roll, the pointer 181 is in register with another pointer 182 projecting from a plate 183 that is fastened to the inner face of the housing 101. The outer gimbal ring being normally stabilized in a position parallel with the horizon, the pointer 181 will indicate the same. As the housing 101 turns about the axis 23—29 in response to the rolling of the ship, the pointer 182 swings laterally of the horizon-indicating pointer 181, and when aligned with it indicates that the ship is at its position of mid-roll.

It being difficult to throw the brake operating handle just as the pointers 181 and 182 come into register, another pointer 184 projects from the plate 183. The pointer 184 is a limit pointer and is spaced from the pointer 182 an amount representing a permissible tolerance within which to operate the brake-actuating handle 160, thus insuring that the gyroscope will be restrained in a position in which the spinning axis of its rotor is nearly vertical, if not exactly so. The actual case will be shown by the relative positions of the points 181 and 182, as seen through the window 104.

Discovering in this way that the spinning axis of the gyroscope is not exactly vertical after the brake mechanism has locked the gyroscope, the knob 70 may be turned thereby actuating in turn the shaft 71, the lever 76, the inner plunger 81, the lever 82, the horizontal bell crank lever 85 and the vertical bell crank lever 92', to tilt the outer and inner gimbal rings 21 and 19 respectively relatively to the locked gyroscope. The trigger plate 34 is turned with the end plate 28 of the outer gimbal ring until a tongue 185 clamped in the trigger plate, as shown in Fig. 7, is brought opposite a notch 186 in an alining latch 187.

A spring 188, which is attached at one end to a post on the latch 187 and which extends through a clearance hole in the wall 2, has its other end affixed to the reverse side of the wall. The registration of the tongue 185 and the alining latch notch 186 results in an automatic snapping of the walls of the notch into an embrace of the tongue 185, the spring 188 turning the alining latch 187 on its fulcrum pin 189, as the notch 80ª in the under side of the plunger 80 registers with the latch 187, as will be understood from Fig. 9. When this happens, the outer gimbal ring 21 is latched in its zero or horizontal position, the inner gimbal ring 19 being consequently held from turning about its trunnion axis 18—18, and also being horizontal, when the ship is on an even keel. The spinning axis of the locked gyroscope 16 will then be vertical at the middle of the ship's roll. Also restrained from turning on its trunnions is the mirror 8, through the already described connection of its bent lever 39 to the latched trigger plate 34.

To enable the latching lever 187 to be adjusted so that its notch 186 will be properly alined with the trigger plate tongue 185, the fulcrum pin 189 for the latching lever projects into a slot 190 in the wall 2. In adjusting, the fulcrum pin 189 is shifted by first loosening a screw 191, shown in Figs. 7 and 14 a screw driver being used to then turn a slotted eccentric 192 seated in the wall 2. An eccentric pin 193 projects from the body of the eccentric into a slot in an adjusting plate 194, and serves to turn the latter about the loosened holding pin 191 to shift the fulcrum pin 189 for the latching lever in the slot 190 in the wall 2. When the notch 186 in the latching lever is alined with the tongue 185 of the trigger plate, the holding screw 191 is again tightened.

To avoid improper precessional effect on the gyroscope 16 by a preponderance of weight on one side of the trunnion axis 23—29, a counterweight 195 is secured to the outer gimbal ring 21 as shown in Figs. 9 and 10. This counterweight is substantially U-shaped, giving access to the adjacent trunnion 22, thus permitting adjustment of it.

When the horizontal bell crank lever 85 is operated to turn about its pivot 91, its mass is shifted, so that its arm that extends toward the window 104 is moved outward. The center of gravity of the lever 85 would also be shifted outward, so that the leverage to the point of concentration of the weight of the lever 85 (its center of gravity) from the axis 23—29 of the outer gimbal ring would be increased. This, of course, would apply a torque about the last mentioned axis, causing the gyroscope 16 to precess about the trunnion axis 22—22, which is not desired.

Prevention of this effect is obtained by providing the horizontal bell crank lever 85 with a third arm 196, on which a properly located and proportioned weight 197 is fastened. The result of this is to locate the center of gravity of the horizontal lever 85 and the weight approximately at g, where, when the lever is swung about its pivot 91, the movement of the center of gravity g will be substantially along the line o—o. This movement is practically parallel to the axis 23—29, and, therefore, does not appreciably change the leverage from that axis to the center of gravity of the lever 85. Accordingly, there is no disturbance in the balance of the gimbal rings about the axis 23—29, and no consequent improper gyroscopic precession from this source.

Limit stops are provided for the outer gimbal ring 21, the lower corners of the end plate 28 of this gimbal being shaped into stops 198 that are adapted to co-act with the bracket 84, as is clear from Fig. 12 when there is a certain amount of relative rotary movement between the wall 2 and the gimbal ring 21. As shown in Fig. 10, the inner gimbal ring 19 is provided with lugs 199 adapted to be engaged by the outer gimbal ring 21 when it tilts to a sufficient extent one way or the other about the axis 22—22.

As shown in Fig. 12, an observation window 200, constructed like the window 104, is located in the wall of the housing 101, and adjacent to it is a socket 201, containing a lamp 202 for illuminating the gyroscope chamber. The optical chamber has a lamp 203 from which light enters slits 204 in the telescope tube 14 to illuminate the horizontal cross wire 205 and the vertical cross wire 206 of the telescope.

In the operation of the instrument described above, assuming the gyroscope to be in operation and the ship be rolling and pitching with the instrument directed athwartships, the plane of rotation of the gyroscope remains fixed in space and consequently the inner ring 19 is stabilized about its trunnion axis 22—22 at right angle to the trunnions 18—18 by which it is connected to the gyroscope. This stabilization is about an axis substantially parallel to the line of sight, but in addition the ring 19 is also stabilized about the axis of the trunnions 18, 18, which is an axis perpendicular to a vertical plane containing the line of sight. This stabilization results from the connection between the gyroscope and the ring 19 provided by the bell crank lever 92' as hereinbefore described in detail. Stabilization of the ring 19 about the axis 18—18 holds the trunnions 22, 22 in a fixed plane and therefore the ring 21 is stabilized together with the plate 34 which is attached to this ring but lies in the optical chamber.

It has been explained that the distance between the trunnion axis 10—10 of the mirror 8 and the roller stud 46 which is the point of connection of arm 39 with plate 34 is twice the distance between the trunnion axis 23—29 and the same point of connection, so that the relative movement between the stabilized plate 34 and the mirror 8 will be one-half of the relative movement between the stabilized elements and the ship due to rolling of the latter about an axis perpendicular to a vertical plane containing the line of sight. The image of a distant object is thus maintained fixed in the field of view of the telescope in spite of the roll of the ship.

Figure 6A:
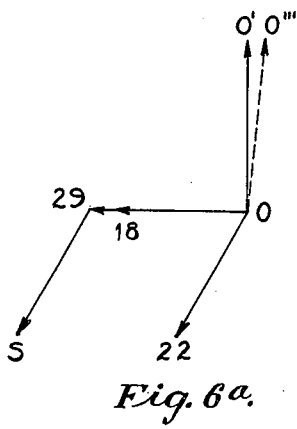

In case the gyroscope wanders about its trunnions 18, 18 from the normal position with its spinning axis truly vertical, the ring 19 will be correspondingly tilted and so will the trunnions 22, 22 and the outer ring 21, since the bell crank lever 92' causes the ring 19 to follow the straying of the gyroscope about its trunnions 18, 18. This tends to displace the image of the distant object with respect to the cross wires of the telescope, or in other words, a straying of the image in the field of view would be manifested to the observer. This tendency may, however, be compensated by manipulation of the knob 70 which through shaft 71, lever 76, plunger 81, lever 82, and lever 85 causes the bell crank lever 92' to be shifted about its end 95 as a pivot with a corresponding displacement of bracket 94 and ring 19 to which the bracket is attached. In other words, the effect of this adjustment is to move the ring 19, trunnions 22, 22 and outer ring 21 relatively to the gyroscope about the axis 18—18 and the coinciding axis 23—29. This movement produces a corresponding alteration of the position of the plate 34 with respect to its former position and this is accompanied by a relative change in the position of the mirror 8 to alter the position of the image of the distant object with respect to the cross wires until it is restored to its original position in registry therewith. While the rings 19 and 21 and their connecting trunnions 22, 22 are displaced relatively to the gyroscope by the adjustment described above, the trunnions remain parallel to the line of sight while the gyroscope wanders with respect to these trunnions. This is different than in previous instruments of this character, as shown diagrammatically in Figs. 1 and 2, in which the correspondingly positioned trunnions 18, 18 partake of the wandering movement of the gyroscope and the stabilized element must be shifted with respect to these trunnions to compensate for such wandering. The errors to which such instruments are subject due to movement of the ship about an axis parallel to the line of sight are therefore eliminated in the present instrument as has been explained in connection with Figs. 6 and 6a.

If the object sighted upon happens to be nearby or the sighting device is located at a considerable height or a combination of these conditions exists, the image of the object is brought into the field of view by manipulation of the bell crank lever 92' from the knob 70 in the manner already described to cause the mirror 8 to be tilted to the required position to reflect the image of the object into the telescope. This is in effect a depression of the line of sight from its substantially horizontal position for a remote object, but even under these conditions the trunnions 22, 22 are always parallel to the line of sight as their associated rings 19 and 21 are tilted relatively to the gyroscope to bring the object into the field of view. The error arising under these conditions in the prior instruments of this character is therefore eliminated as has been explained in connection with Figs. 6 and 6ª.

Due to the stabilizing effect of the gyroscope the plate 28 which is connected to the outer ring 21 is also stabilized together with arms 57 extending from the plate and the trigger 56 mounted at the top of the arms. There is thus produced by the roll of the ship a relative movement between the trigger and the co-acting parts of the firing mechanism which are mounted on base plate 48 which partakes of the angular movement of the ship. The trigger 56 and the lugs 55 and 55' constitute an escapement which causes the lever 54 to be swung twice during each complete oscillation of the ship. The connection between lever 54 and lever 59 causes the latter to be correspondingly shifted to carry the contact wheels 63 and 64 from one side of the insulating strip 65 to the other. There is an instant during their movement when one of the wheels bears on one of the carbon inserts of the contacts 66 and 67 while the other one bears on the other insert. This establishes the firing circuit which includes the contacts in its circuit. As the outer ring 21 is shifted relatively to the gyroscope to compensate for wandering of the gyroscope or on account of the position of the distant object, the end plate 28, which is integral with the ring 21, turns to a like degree about the axis 23—29, the pin 32 that is arranged to travel in the arcuate slot 33 in the wall 2 effecting a corresponding and simultaneous rotary adjustment of the plate 34 in the optical chamber and the end plate 28 of gimbal ring 21 in the gyroscope chamber. Consequently, as the mirror 8 in the optical chamber is restored to the position where it bears upon the distant object again, the end plate 28 turns the arms 57 rigid with it, thereby repositioning the ends of the trigger 56 of the firing mechanism with respect to the escapement lugs 55 and 55'. There is a resultant tilting of the lever 54, which through link 58 also correctively tilts the lever 59, thus shifting the contact wheels 63 and 64 with respect to the divisional insulation strip 65 between the contacts 66 and 67.

In view of the just described movements, it is evident that though the gyroscope, in wandering, throws off both the pivotally mounted mirror in the optical chamber and also the contacts of the firing mechanism the adjustment of the outer gimbal ring 21 by the knob 70 restores the mirror to its proper position for observation and simultaneously the contact wheels 63 and 64 are returned to the relation they bore to contacts 66 and 67 before the aberration of the gyroscope set in. This establishes anew the same predetermined firing point in the roll of the ship.

While a preferred embodiment of the invention has been shown and described it will be undrstood that it may be embodied in other forms and that various changes in the details of construction of the instrument may be made without departing from the sprinciple of the invention as defined in the appended claims.

I claim:—

1. In a fire-control instrument for use on a body subject to oscillation, a sighting device adapted to have its line of sight disposed angularly to the axis of oscillation of the body and comprising an optical part constructed to oscillate with the body and an optical part free from such constraint, and means stabilizing the second optical part about an axis perpendicular to the line of sight including a member stabilized about intersecting axes, one of which is parallel to the line of sight and another member stabilized by said first member about an axis perpendicular to said line of sight and connected to the second optical part.

2. In a fire-control instrument for use on a body subject to oscillation, a sighting device adapted to have its line of sight disposed angularly to the axis of oscillation of the body and comprising an optical part oscillatory with the body and an optical part free from oscillation therewith, a stabilizer, a mounting therefor comprising a member stabilized thereby about axes parallel and perpendicular to the line of sight and another member stabilized by the first member about an axis perpendicular to the line of sight and stabilizing the second optical part about the last named axis.

3. In a fire-control instrument for use on a body subject to oscillation, a sighting device comprising an optical part oscillatory with the body and an optical part free from oscillation therewith, a gyroscope, and a mounting therefor comprising members one of which is stabilized by the gyroscope about intersecting axes said gyroscope being capable of precession about the axes, another of said members being stabilized by the first mentioned member about an axis perpendicular to the line of sight of the sighting device and stabilizing the second optical part about the last named axis.

4. In a fire-control instrument for use on a body subject to oscillation, a sighting device adapted to have its line of sight disposed angularly to the axis of oscillation of the body and comprising an optical part oscillatory with the body and an optical part free from oscillation therewith, a gyroscope and a mounting therefor comprising a member stabilized by the gyroscope about perpendicular axes respectively parallel and perpendicular to the line of sight of the sighting device and another member stabilized by the first member about an axis perpendicular to the line of sight, and means for independently adjusting said second optical part with respect to the gyroscope.

5. In a fire-control instrument for use on a body subject to oscillation, a sighting device comprising different optical parts respectively participating in and free from the oscillation of the body, a firing mechanism coacting with said sighting device, a gyroscope comprising a rotor and a casing and a mounting therefor comprising members one being stabilized about an axis parallel to the line of sight of the sighting device and both being stabilized about an axis perpendicular to the line of sight, the second mentioned optical part and a part of said firing mechanism being stabilized by the second mentioned member about an axis perpendicular to the line of sight.

6. In a fire-control instrument for use on a body subject to oscillation, a sighting device comprising an optical part adapted to partake of and another optical part free from the oscillation of the body, a stabilizer, a support therefor pivotally mounting the stabilizer about an axis perpendicular to the line of sight of the sighting device said support permitting casual deviation of said stabilizer about an axis parallel to the line of sight of said sighting device and stabilizing the second optical part about an axis perpendicular to said line of sight, and means for retaining the stabilizer in fixed position.

7. In a fire-control instrument for use on a body subject to oscillation, a sighting device and a firing mechanism, each comprising parts adapted to partake of the oscillation of the body and parts free therefrom the parts of the sighting device including optical elements, a stabilizer, a support therefor pivotally mounting the stabilizer about an axis perpendicular to the line of sight of the sighting device said support permitting casual deviation of said stabilizer about an axis parallel to the line of sight of said sighting device and stabilizing the second mentioned parts about the axis perpendicular to the line of sight.

8. In a fire-control instrument for use on a body subject to oscillation, a sighting device and a firing mechanism each comprising parts adapted to partake of the oscillation of the body and parts free therefrom the parts of the sighting device including optical elements, a stabilizer, a support therefor pivotally mounting the stabilizer about an axis perpendicular to the line of sight of the sighting device said support permitting casual deviation of said stabilizer about an axis parallel to the line of sight and stabilizing the second mentioned parts about the axis perpendicular to the line of sight, and means for locking the stabilizer in a plurality of positions.

9. In a fire-control instrument for use on a body subject to oscillation, a sighting device and firing mechanism each comprising parts adapted to partake of the oscillation of the body and parts free therefrom, the second mentioned parts of said device and mechanism being interconnected, a gyroscope, a universal support therefor stabilized thereby in part about axes respectively perpendicular and parallel to the line of sight of said device and having another part stabilized about an axis perpendicular to the line of sight of the last named part stabilizing certain of said interconnected parts one of which is an optical part, and means for adjusting said interconnected stabilized parts independently of said gyroscope.

10. In a fire-control instrument for use on a body subject to oscillation, a sighting device comprising an optical part movable with the body and an optical part free from corresponding oscillation therewith, a gyroscope comprising a rotor and a casing, and a universal support therefor comprising members pivoted respectively about axes parallel with and perpendicular to the line of sight of said sighting device, said support stabilizing the second optical part about an axis perpendicular to the line of sight.

11. In a fire-control instrument for use on a body subject to oscillation, a sighting device comprising an optical part movable with the body and an optical part free from corresponding oscillation therewith, a gyroscope comprising a rotor and a casing, a support therefor comprising a plurality of members pivoted to each other and to the gyroscope about individual axes angularly disposed to each other and a support pivotally mounting the gyroscope-support, one of said members being stabilized by connection with said gyroscope and stabilizing the second optical part by connection therewith.

12. In a fire-control instrument for use on a body subject to oscillation, a sighting device and a firing mechanism each having parts movable in accordance with the oscillation of the body and other parts free from corresponding movement, the latter parts including an adjustable optical part in the sighting device and movable means operatively connected therewith, movable co-operating elements in the firing mechanism responsive to the oscillation of the body, a gyroscope comprising a rotor and a casing, pivotally supported mutually pivoted members pivotally supporting said gyroscope, one of said members being stabilized therefrom only about an axis perpendicular to the line of sight of said sighting device and parts jointly stabilized by the last named member co-acting with said movable parts and elements of the sighting device and firing mechanism.

13. In a fire-control instrument, a pivotally mounted gyroscope, co-acting elements some of which are connected to the gyroscope for stabilization, an annular brake member rigid with the gyroscope structure, a plurality of brake shoes, and means for moving the latter into and out of engagement with said annular brake member.

14. In a fire-control instrument, a pivotally mounted gyroscope, co-acting elements some of which are connected to the gyroscope for stabilization, a brake member rigid with the gyroscope and having an annular periphery, a plurality of brake shoes normally out of contact with said brake member, and means operable to move the brake shoes into arresting engagement with the periphery of said brake member said means including a yielding pressure-developing member.

15. In a fire-control instrument, a gyroscope, co-acting elements some of which are connected to the gyroscope for stabilization, a pivoted support for said gyroscope, means for independently adjusting the stabilized elements with respect to the gyroscope, said means including a member supported by said pivoted support and displaceable in a direction tending to precess the gyroscope, and means effective to preserve the center of gravity of said displaceable member in position to avoid precession of the gyroscope.

16. In a fire-control instrument, a gyroscope comprising a rotor and a casing, a sighting device having optical parts, a firing mechanism comprising an electric switch having relatively movable contacts and operating means therefor, and inner and outer gimbal rings supporting and adapted to be stabilized by said gyroscope, the inner gimbal ring being pivoted about an axis parallel to the line of sight of said sighting device and the outer gimbal ring being pivoted about an axis perpendicular to the line of sight and adapted to stabilize certain elements of said optical parts and switch-operating means.

17. In a fire-control instrument, a gyroscope, a sighting device having optical parts, a firing mechanism comprising an electric switch having relatively movable contacts and operating means therefor, inner and outer gimbal rings pivoted about intersecting axes the gyroscope being pivoted about the inner gimbal ring about an axis movable out of but capable of being coincident with the pivotal axis of the outer gimbal ring, and means to independently adjust said elements with respect to the gyroscope.

18. In a fire-control instrument subject to oscillation, parts participating in the oscillation of the instrument, a gyroscope, pivotally mounted gimbal rings supporting the same and stabilized thereby, other parts stabilized by one of said gimbal rings, and means for adjusting said stabilized parts with respect to the gyroscope comprising an articulated linkage carried in part by the last mentioned gimbal ring.

19. In a fire-control instrument, a housing, co-acting parts therein including a stabilized gimbal ring pivoted about an axis and elements stabilized thereby about an axis, and means for independently adjusting said elements comprising external operating means, a plunger extending exteriorly and interiorly of said housing, and movable parts within said housing in part movably mounted upon said gimbal ring.

20. In a fire-control instrument, a housing, co-operating parts therein including a gyroscope, a support therefor having a stabilized gimbal ring, elements stabilized thereby about axes, means for arresting the gyroscope at will, and means for adjusting said elements with respect to the gyroscope, both of said means being operable exteriorly of said housing and each including a plunger one of which is telescoped with the other.

21. In a fire-control instrument, co-operating parts comprising a gyroscope, a support therefor including a stabilized gimbal ring, axially stabilized elements, means for adjusting said elements with respect to the gyroscope, a brake for the latter, brake-operating means, and latching means for said elements coacting with said brake-operating means.

22. In an instrument of the character described, a gyroscope, a gimbal support therefor, an element adjustable with respect to the gyroscope, and means for adjusting said element comprising movement-transferring medium carried by said gimbal spport, a force-applying member pivoted to another support, a lever fulcrumed on said gyroscope and connected with said gimbal support, and thrust pins interposed between portions of said movement-transferring medium and said force-applying member and said lever, said pins being free from turning-moment-developing-propensities.

23. In an instrument of the character described, a gyroscope, a support therefor including a gimbal ring, an element adjustable with respect to the gyroscope, and means for adjusting said element comprising a fulcrumed lever carried by said gimbal ring, a force-applying lever pivoted to a support other than the gimbal ring, a lever fulcrumed on said gyroscope and connected with said support for said gyrosope, thrust pins interposed between said levers and free from turning-moment-developing propensities, and means to offset torque-producing tendencies due to movement of the lever carried by said gimbal ring.

24. In an instrument of the character described, a gyroscope, mutually and universally pivoted gimbal rings supporting and stabilized by said gyroscope, means operable to engage the gyroscope to precess it about an axis, and means to turn said gimbal rings to precess the gyroscope about an axis disposed angularly to the first mentioned axis.

25. In an instrument of the character described, a housing, a gyroscope capable of precessing, elements adapted to be stabilized by said gyroscope, members co-acting with the stabilized elements, a brake applicable to said gyroscope in a variety of its possible positions, brake-operating means, and means for adjusting said elements independently of the gyroscope, both of said means having actuating levers the same being pivoted to a common support exteriorly of said housing.

26. In an instrument of the character described, a housing, a gyroscope capable of precessing, elements adapted to be stabilized by said gyroscope, members co-acting with the stabilized elements, a brake applicable to said gyroscope in a variety of its possible positions, brake-operating means, and means for adjusting said elements independently of the gyroscope, each of said means including an actuating lever and a plunger operable thereby, said levers having a common support exteriorly of said housing and said plungers being telescoped and acted upon by said levers, the plungers extending into said housing.

27. In an instrument of the character described, a housing adapted to oscillate with an oscillatory body and provided with a window, a gyroscope within said housing, and an indicating device seen through the window and comprising a member stabilized by the gyroscope and a plurality of elements movable in response to the movement of the housing and co-acting with said member, one of said elements indicating the approach of a predetermined point in the oscillation of the body and another of said elements designating the existence of a definite relation between said predetermined point and the position of the gyroscope.

28. In an instrument of the class described, a housing adapted to oscillate with an oscillatory body and provided with windows, a gyroscope and connected gimbal rings mounted within the housing supporting the gyroscope, elements stabilized by the gyroscope through the gimbal rings, members responsive to the oscillation of the housing coacting with said elements, a source of illumination within the housing in relation to one of the windows for improved inspection therethrough, and means visible through another window revealing the relation of the housing and gyroscope.

29. In a fire-control instrument, a housing having optical and gyroscope chambers, a gyroscope in the second mentioned chamber, a plurality of gimbal rings supporting and stabilized by the gyroscope, an optical system and firing mechanism in the optical and gyroscope chambers, respectively, said optical system and mechanism having elements stabilized from a gimbal ring, means for adjusting said stabilized elements, a brake for said gyroscope, and individual operating means for said adjusting means and brake operable exteriorly of said housing and passing through the optical chamber into the gyroscope chamber.

30. In a fire-control instrument, a housing having a tubular telescope support, mechanism within said housing, a plunger entering said housing and adapted to actuate a part of said mechanism, a lever external to said housing adapted to operate said plunger, a bracket affixed to said telescope support and to which said lever is pivoted, and an eccentric operable to actuate said lever.

31. In a fire-control instrument, a housing having a tubular telescope support, mechanism within said housing, a pair of telescoped plungers entering said housing adapted to actuate different parts of said mechanism, a lever for each plunger, a bracket secured to said telescope support both levers being pivoted thereto, gradual operating means for one of said levers and means permitting rapid actuation of the other lever.

32. In an instrument of the class described, a housing, mechanism therein, a pair of telescoped plungers entering said housing and adapted to actuate different parts of said mechanism, external levers for operating said plungers, one lever and one plunger having mutually guided portions and the other lever operatingly engaging the innermost of said telescoped plungers.

33. In an instrument of the character described, a pivotally supported gyroscope, mechanism for precessing the gyroscope comprising pivoted oppositely acting arms, means for normally holding the arms in retracted position, operating means associated with one of the arms and connections between the arms whereby actuation of the operating means in reverse directions brings but one of said arms at a time in operative relation to the gyroscope.

In testimony whereof I affix my signature.

GEORGE B. CROUSE.